Patented Aug. 8, 1939

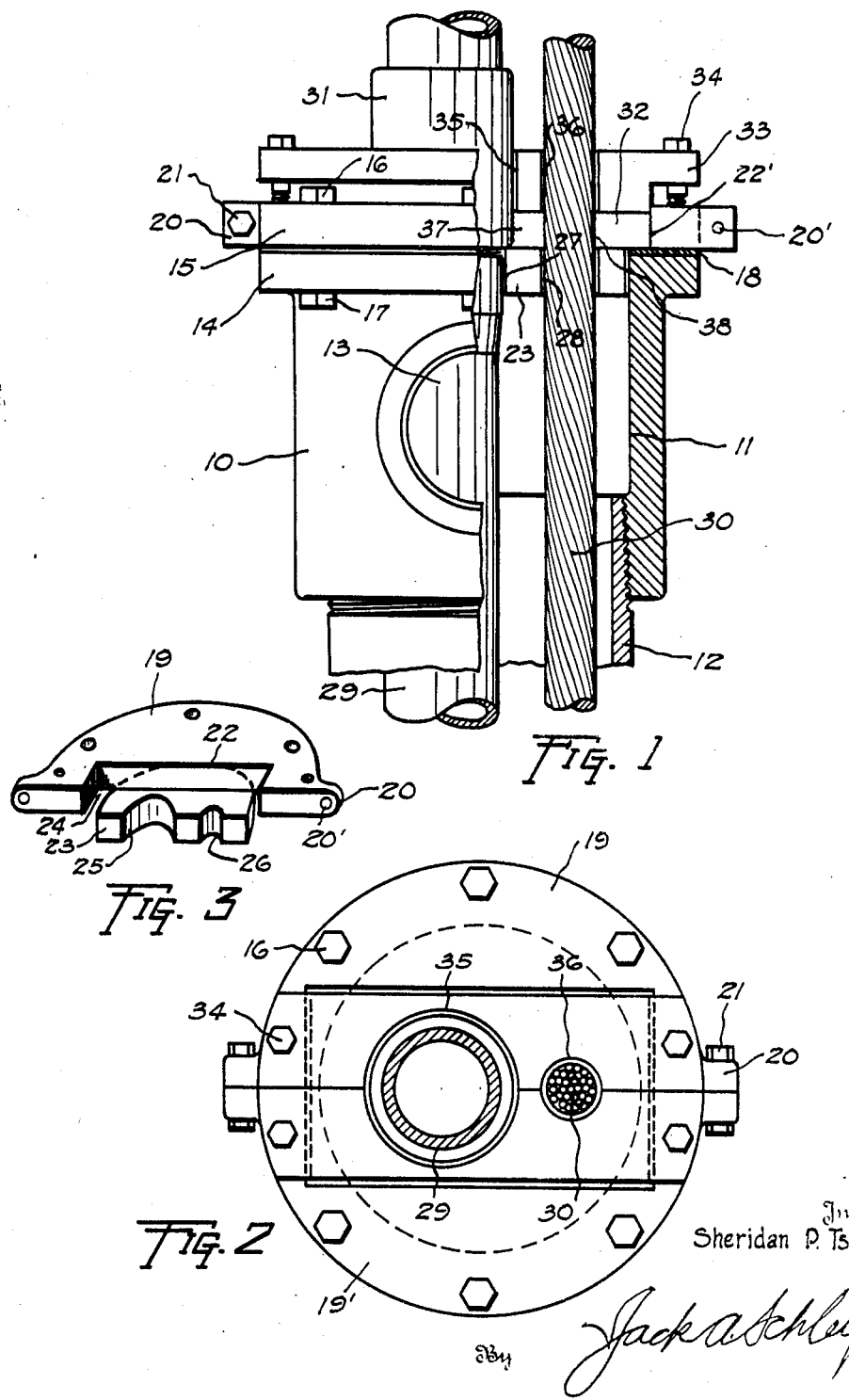

2,168,591

UNITED STATES PATENT OFFICE 2,168,591

TUBING HEAD

Sheridan P. Tschappat, Tulsa, Okla.

Application August 9, 1937, Serial No. 158,076

5 Claims. (Cl. 166—14)

My invention relates to new and useful improvements in tubing heads having packing means for a cable or pipe separate from the tubing.

It has become the practice to use an electric pump mounted down in the well casing, as described in my co-pending application, Serial No. 146,027, filed June 6, 1937, and in my Patent No. 2,001,946 issued May 21, 1935. To do this, the tubing head must be constructed so as to allow an electric cable to pass down into the well and to pack off said cable so that leakage does not occur at the well head. One object of this invention is to accomplish this end, but I wish to point out that the tubing head I have disclosed may be used to pack off a small pipe or any similar element in addition to the usual tubing.

One object of the invention is to provide an improved tubing head adapted to receive and carry a structure such as hereinafter disclosed which may be produced at low cost and wherein the construction is simple, durable, and strong.

Another object of the invention is to provide an improved hanging and packing means, whereby the pipe or tubing may be suspended and said pipe and an extraneous member such as a cable or pipe, may be efficiently packed off.

A further object of the invention is to provide a suspending and packing assembly having means for supporting the tubing and also means for receiving and supporting a packing element in contact with the tubing, as well as provision for the passage and packing off of a cable or pipe.

Another object of the invention is to provide an improved tubing head wherein provision is made for the packing off of a cable, small pipe, or other extraneous element in addition to the tubing, said tubing head being constructed so that it may be readily dismounted to replace worn or broken parts and having the packing and packing gland split so as to allow the elements being packed off to be easily and quickly inserted.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view partly in elevation and partly in section of a tubing head constructed in accordance with the invention, Figure 2 is a plain view of the tubing head, and Figure 3 is an isometric view of one of the halves of the cap member.

In the drawing the numeral 10 designates a cylindrical body or housing having a bore 11. The lower end of the bore is internally screw-threaded so that the body 10 may be mounted on the upper end of a well casing 12, or other support. The body is provided with the customary radial ports 13 which extend through the side walls thereof and receive outlet pipes (not shown) for conducting the well fluid from the casing 12. The upper end of the body is formed with an annular flange 14 and a flanged cap member 15 is designed so as to be fastened to the flange 14 by bolts 16 and nuts 17. A suitable packing gasket 18 may be interposed between the flanges.

The cap member 15 is formed in two halves 19 and 19' so as to allow the tubing and cable to be readily inserted and withdrawn. These halves have ears 20 with orifices 20' therein whereby said halves may be joined by bolts 21. Each half or member is substantially semicircular in shape and has a rectangular recess 22 cut in its inner, mating side. A depending semicircular member 23 welded to or integral with the underside of each half member is located concentrically with the half 19 so that its inner side is in a vertical plane, and in alignment, with the inner side of half 19, as is best shown in Figure 3. The diameter of the depending member is slightly less than the length of the recess 22 so that spaces 24 are provided. The members 23 are formed with semicircular recesses 25 and 26 in their vertical, inner faces, so that when the halves 19 and 19' are placed together, carrying with them their respective members 23, to form the complete cap member, the mating semicircular recesses in the respective depending members 23 form orifices 27 and 28, adapted to receive a tubing 29 and a cable 30 respectively. The tubing passes through orifice 27 and is supported therein by a coupling 31. As shown in Figure 1, the tubing hangs off center to allow space for the cable, which passes through orifice 28.

A packing member 32 fits into the recess 22' formed by joining the two halves 19 and 19' and a suitable flanged packing gland 33 rests thereon, said packing gland being provided with orifices 35 and 36 adapted to register, and be in alignment, with the orifices 27 and 28, respectively in the depending member 23. The gland 33 is secured to the cap 15 by stud bolts 34. The packing member 32 is similarly designed with orifices 37 and 38 adapted to register, and be in alignment, with the orifices 27 and 28 respectively, in the depending member 23, and the orifices 35 and 36, respectively, in the packing gland 33. Both the packing member 32 and the gland 33 are split, as shown in Figure 2, to facilitate the removal of the tubing and cable.

When the well tubing is in position in the tubing head the packing gland 33 may be forced down by bolts 34 distorting the packing member 32 until a tight seal is obtained. The weight of the tubing is not supported on the packing member and therefore no shearing action is experienced by the latter. This tubing head is designed to be manufactured at a low initial cost and to supply a moderately priced but efficient head for the packing off of a well tubing and an extraneous element.

What I claim and desire to secure by Letters Patent is:

1. A well tubing head including, a housing, a supporting element mounted on the housing and having a transversely elongate packing recess in its upper side arranged so that the tubing and a vertical element may extend therethrough, an elongate packing common to both the tubing and the vertically extending element supported in said recess, and means fastened on the support for distorting said packing to pack off both the tubing and the vertically extending element.

2. A well tubing head including, a housing, a closure member mounted on the housing and having an elongate recess provided with openings in its bottom for receiving an upright tubing and a cable, packing disposed transversely of the closure in said recess for engaging around a tubing and a cable, and means on the closure for engaging and distorting said packing.

3. A well tubing head including, a housing, a closure member mounted on the housing and having an elongate recess provided with openings in its bottom for receiving an upright tubing and a cable, spaced from said tubing, packing disposed transversely of the closure in said recess for engaging around a tubing and a cable, and means fastened on the closure for engaging and distorting said packing.

4. A well tubing head including, a housing, a transverse closure member having an elongate transverse slot, a support secured to the underside of said member and extending across said slot to form a bottom therefor, said support having openings therein for receiving a tubing and a cable passed through said slot, the closure member being split through said slot and support to permit placing it around a tubing and cable, a packing disposed in the slot of the closure and resting upon said support, and means for distorting said packing to pack off around a tubing and a cable passed through said closure.

5. A well tubing head including, a housing, a transverse closure mounted on the housing and having an opening therein, a support mounted on the bottom of said closure extending across said opening and having means for passing a tubing and a cable therethrough, a packing engaging in the opening of the closure and resting upon said support, and means for distorting said packing to pack off a tubing and a cable passed through said closure.

SHERIDAN P. TSCHAPPAT.